United States Patent
Verstegen

(10) Patent No.: US 11,378,815 B2
(45) Date of Patent: Jul. 5, 2022

(54) MULTI-VIEW DISPLAY DEVICE AND METHOD

(71) Applicant: KONINKLIJKE PHILIPS N.V., Eindhoven (NL)

(72) Inventor: Emile Johannes Karel Verstegen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 337 days.

(21) Appl. No.: 16/500,121

(22) PCT Filed: Apr. 4, 2018

(86) PCT No.: PCT/EP2018/058555
§ 371 (c)(1),
(2) Date: Oct. 2, 2019

(87) PCT Pub. No.: WO2018/185133
PCT Pub. Date: Oct. 11, 2018

(65) Prior Publication Data
US 2021/0109369 A1    Apr. 15, 2021

(30) Foreign Application Priority Data

Apr. 5, 2017 (EP) .................................... 17165020

(51) Int. Cl.
*G02F 1/13* (2006.01)
*G02B 30/28* (2020.01)
*G02F 1/137* (2006.01)

(52) U.S. Cl.
CPC .......... *G02B 30/28* (2020.01); *G02F 1/1323* (2013.01); *G02F 1/13718* (2013.01)

(58) Field of Classification Search
CPC ... G02B 30/28; G02F 1/1323; G02F 1/13718; G02F 1/133562; G02F 1/294;
(Continued)

(56) References Cited

U.S. PATENT DOCUMENTS 6,069,650 A * 5/2000 Battersby ................ G02F 1/29
348/E13.043
6,518,944 B1 * 2/2003 Doane ................ G02F 1/13318
345/87
(Continued)

FOREIGN PATENT DOCUMENTS

CN   108828857 A  * 11/2018  ......... G02F 1/13306
TW   491965 B        7/2015
WO   WO-9705520 A1 *  2/1997  ......... G02F 1/13362

OTHER PUBLICATIONS

Lavrentovich et al "Electrically Tunable Selective Reflection of Light from Ultraviolet to Visible and Infrared by Heliconical Cholesterics" Advanced Materials vol. 27, Issue 19, 2015 p. 3014-3018.
(Continued)

*Primary Examiner* — Donald L Raleigh

(57) ABSTRACT

A multi-view display device (1) is switchable between a single view and a multiple view mode. The display device comprises a display panel (3) having rows and columns of pixels or sub-pixels (5) configured to produce a display output. A lenticular lens arrangement (9) is arranged over a display output side of the display panel and includes an array of lenticular lens elements (11) which comprise an electro-optic material (23) adjacent a non-switchable optically transparent layer (21). The electro-optic material comprises a cholesteric liquid crystal component having an ordinary refractive index and an extra-ordinary refractive index. The cholesteric liquid crystal component comprises a helical structure defined by a pitch which is selected such that a product of the pitch and the difference between the ordinary and extra-ordinary refractive indices is equal to or less than a visible light wavelength of the display output. An effective refractive index of the cholesteric liquid crystal component is controllable by application of an electrical stimulus
(Continued)

thereby permitting switching between the single view and multiple view modes.

20 Claims, 4 Drawing Sheets

(58) Field of Classification Search
CPC .......... G02F 1/13471; G02F 1/133526; G02F 1/1347; H04N 13/305; H04N 13/356
See application file for complete search history.

(56) References Cited

U.S. PATENT DOCUMENTS

| | | | |
|---|---|---|---|
| 2008/0138543 A1* | 6/2008 | Hoshino | G07D 7/12 428/29 |
| 2014/0009704 A1 | 1/2014 | Pijman et al. | |
| 2014/0118646 A1 | 5/2014 | Jeon et al. | |
| 2016/0101642 A1* | 4/2016 | Richert | B41M 3/148 428/328 |
| 2016/0202493 A1 | 7/2016 | Hong | |
| 2017/0097530 A1* | 4/2017 | Tsao | G02F 1/13306 |

OTHER PUBLICATIONS

Kim et al "Short pitch cholesteric electro-optical device stabilized by nonuniform polymer network" Applied Physics Letters, vol. 86, 161118 (2005).

Hamdi et al "Liquid Crystal Bubbles Forming a Tunable Micro-Lenses Array" Journal of Applied Physics, vol. 110, No. 7, Oct. 3, 2011 p. 74902-74902.

Kim, Sang Hwa and Chien, Liang-Chy (2005). Short Pitch Cholesteric Electro-Optical Device Stabilized by Nonuniform Polymer Network. Applied Physics Letters 86(16). doi: 10.1063/1.1897057 Retrieved from http://digitalcommons.kent.edu/cpippubs/144.

Xiang et al "Electrically Tunable Selective Reflection of Light from Ultraviolet to Visible and Infrared by Heliconical Cholesterics" Adv Mater. May 20, 2015; 27(19): 3014-3018.

International Search Report from PCT/EP2018/058555 dated Jun. 6, 2018.

* cited by examiner

MULTI-VIEW DISPLAY DEVICE AND METHOD

CROSS-REFERENCE TO PRIOR APPLICATIONS

This application is the U.S. National Phase application under 35 U.S.C. § 371 of International Application No. PCT/EP2018/058555, filed on Apr. 4, 2018, which claims the benefit of EP Patent Application No. EP 17165020.3, filed on Apr. 5, 2017. These applications are hereby incorporated by reference herein.

FIELD OF THE INVENTION

This invention relates to a multi-view display device of the type that comprises a display panel having an array of display pixels for producing a display, and a lenticular lens arrangement arranged over the display panel through which the display pixels are viewed.

BACKGROUND OF THE INVENTION

There are two basic types of multi-view display device. One type is for simultaneously presenting different images to different viewers at different spatial locations. For example, one viewer can be in the driver's seat of a vehicle and another can be in the passenger's seat. The driver can be displayed driver-related content such as satellite navigation content, and the passenger can be displayed entertainment content. There may be more than two views, i.e. for multiple viewers.

Another type is autostereoscopic displays for displaying the views for different eyes to different spatial locations. There may be two views, e.g. for a single viewer at a single position, but there may be many more views (e.g. 9 or 15) so that multiple viewers can be in the field of view and/or so that a viewer can move relative to the display to experience a look around effect.

The principles behind the generation and spatial separation of the different views are the same in these devices. Essentially, different two-dimensional content is projected to different spatial locations simultaneously. The only difference is that the angular separation of views is typically less for the autostereoscopic display (approximately 2 degrees) than for multi-view displays, where both eyes of a viewer receive the same image. Typically, the different spatial locations extend along a horizontal line, since viewers' eyes are generally at the same vertical height, but at different horizontal positions with respect to the display. For the purposes of explanation, the following will be with reference to autostereoscopic display devices.

A known autostereoscopic display device comprises a two-dimensional liquid crystal display panel having a row and column array of display pixels acting as a spatial light modulator to produce the display. The display pixels are formed of sub-pixels, for example of different colours. Each sub-pixel is the smallest individually addressable display element. Thus in a monochromatic display above definition of sub-pixel coincides with the term pixel. Therefore in the following only the term sub-pixel is used but it is to be understood that in case of a chromatic display such as e.g. a black and white display or the well-known "green screen", the commonly used term pixel falls under the term sub-pixel used in the present patent application. An array of elongate lenticular elements extending parallel to one another lies over the sub-pixel array, and the sub-pixels are observed through these lenticular elements. The lenticular elements are provided as a sheet of elements, each of which comprises an elongate semi-cylindrical lens element. The lenticular elements extend in the column direction of the display panel, with each lenticular element overlying a respective group of two or more adjacent columns of sub-pixels.

In an arrangement in which, for example, each lenticular element is associated with two columns of sub-pixels, the sub-pixels in each column provide a vertical slice of a respective two-dimensional sub-image. The lenticular sheet directs these two slices and corresponding slices from the sub-pixel columns associated with the other lenticular elements, to the left and right eyes of a user positioned in front of the sheet, so that the user observes a single stereoscopic image. The sheet of lenticular elements thus provides a light output directing function.

In other arrangements, each lenticular element is associated with a group of, say, four or more adjacent sub-pixels in the row direction. Corresponding columns of sub-pixels in each group are arranged appropriately to provide a vertical slice from a respective two-dimensional sub-image. As a user's head is moved from left to right a series of successive, different, stereoscopic views are perceived creating, for example, a look-around impression.

The above-described device provides an effective three-dimensional display. However, it will be appreciated that, in order to provide stereoscopic views, there is a necessary sacrifice in the horizontal resolution of the device (the same applies to the resolution of the different images in a multi-view two-dimensional system). This sacrifice in resolution is unacceptable for certain applications, such as the display of small text characters for viewing from short distances or graphics applications needing a high resolution. For this reason, it has been proposed to provide an autostereoscopic display device that is switchable between a two-dimensional mode and a three-dimensional (3D stereoscopic) mode. Such a device is described in U.S. Pat. No. 6,069,650, to which reference is invited. In this device, different groups of sub-pixels, forming one or more stereoscopic pairs, are seen by respective eyes of a viewer through the lenticular elements. The lenticular elements include electro-optic material having a refractive index that is switchable in order to enable removal of the refracting effect of the lenticular elements.

In the two-dimensional mode, the lenticular elements of the switchable device operate in a "pass through" mode, i.e. they act in much the same way as would a flat sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but also suffers the inevitable resolution loss mentioned above.

In order to provide switchable display modes, the lenticular elements of the switchable device use an electro-optic material, such as a liquid crystal material, having a refractive index that is switchable between two different values for polarized light. The device is then switched between the modes by applying an appropriate electrical potential to electrode layers provided above and below the lenticular elements. The electrical potential alters the refractive index of the lenticular elements in relation to that of an adjacent optically transparent layer. Alternatively, the adjacent optically transparent layer may be formed of the electro-optic material, with the same result that the refractive index of the lenticular elements in relation to the optically transparent layer is altered.

Because of its static dielectric anisotropy, the orientation of the liquid crystal material can be controlled through an applied electric field. In the optical regime, there is also dielectric anisotropy, and the index of refraction of the liquid crystal material is related to the relative dielectric constant. The liquid crystal material has an ordinary and an extra-ordinary index of refraction, the former being applicable for light with electric field polarization perpendicular to the director and the latter being applicable for light with electric field polarization parallel to the director.

The applied electrical potential causes the lenticular elements in the selected portion of the display area to switch between maintaining and removing a light output directing function, which will now be explained with reference to FIGS. 1 and 2.

FIG. 1 schematically depicts a cross-sectional view of a portion of the known lenticular element arrangement 9 when no electric potential is applied to the electrodes 17, 19. The lenticular element arrangement 9 is positioned over a display panel 3 comprising an array of sub-pixels 5 arranged in rows and columns. The electrode 17 is sandwiched between a glass plate 13 and a body, or replica, 21. The other electrode 19 is sandwiched between a further glass plate 15 and an orientation layer 26. Here, the rubbing directions of the orientation layers 25 and 26 and the polarization of the display light are in the z-direction (the direction of the lens axes); in this case extending into the plane of drawing of FIG. 1. As a result, the effective lens, although being optically birefringent, can be approximated as an isotropic lens with an index of refraction corresponding to the extra-ordinary index of refraction of the liquid crystal material 23. In this state, the refractive index (that is the extra-ordinary refractive index) of the liquid crystal material 23 for linearly polarized light provided by the display panel 3 is substantially higher than that of the body 21, and the lenticular shapes therefore provide the light output directing function, as illustrated.

FIG. 2 schematically depicts a cross-sectional view of a portion of the known lenticular element arrangement 9 when an alternating electric potential of approximately 50 volts is applied to the electrodes 17, 19. An electric field is created in the y-direction and the liquid crystal molecules align with the field lines. As a result, the director of the liquid crystal material 23 is also substantially in the y-direction. The polarization direction of light from the display panel 3 is still linearly polarized, that is, the E field of the light is in the z-direction. With the polarization of the light of the display in the z-direction, the effective lens will have the ordinary index of refraction, and light will not be refracted since there is an index match between the liquid crystal material 23 and the lenticular body 21. In this state, therefore, the refractive index of the liquid crystal material 23 for light of the linear polarization provided by the display panel 3 is substantially the same as that of the inverse lenticular structure of the body 21, so that the light output directing function of the lenticular shapes is cancelled, as illustrated. Thus, the array effectively acts in a "pass through" mode.

With the light output directing function maintained, as shown in FIG. 1, the lenticular lens elements 11 defined by the liquid crystal material 23 act as convex cylindrical lenses, and provide different images, or views, from the display panel 3 to the eyes of a user positioned in front of the lenticular element arrangement 9. Thus, a three-dimensional image can be provided.

With the light output directing function removed, as shown in FIG. 2, the lenticular lens elements 11 defined by the liquid crystal material 23 act as if they were a flat sheet of transparent material that acts as a pass through layer with no view directing function. Thus, a high-resolution two-dimensional image can be provided employing the full native resolution of the display panel 3.

The control of electrical potentials to switch between display modes is provided to the electrodes 17, 19 of the lenticular element arrangement 9 by a controller 12.

Further details of the structure of a known switchable autostereoscopic display device can be found in U.S. Pat. No. 6,069,650, to which reference is invited.

There are, however, disadvantages associated with such known switchable display devices. In particular, unwanted display artefacts in the two-dimensional mode may be observed when the display device is viewed at oblique angles.

More generally, liquid crystal cells tend to perform better when they are viewed at normal incidence. For instance, in liquid crystal displays compensation foils are used between the second polarizer and the liquid crystal cell in order to compensate for deviations from perpendicular incidence and the associated light leakage/bleeding effects. Similar problems are associated with the use of a switchable lenticular lens, albeit that the optical function is different. In particular, different refractive indices are perceived at oblique angles compared to when the display device is viewed at normal incidence. This may result in different strength or focusing power of the lenticular lens when viewed at oblique angles, leading to 'residue' being observed at oblique angles in two-dimensional mode. This effect may also be detrimental to the performance of the display in three-dimensional mode.

A further disadvantage of such known switchable display device is that it relies on polarized light being used. With non-polarized light, two-dimensional and three-dimensional modes cannot be separated. Therefore certain display types which, for instance, do not emit polarized light, such as OLED displays, can only be used in combination with a conventional switchable lenticular if an additional polarizer is used. The necessity to employ an additional polarizer results in significant light losses.

US 2016/202493 discloses a liquid crystal lens for a display panel which makes use of a cholesteric helical liquid crystal material. US 2014/0118646 discloses a liquid crystal lens panel which also makes use of a cholesteric liquid crystal material.

SUMMARY OF THE INVENTION

There is a need for a multi-view display device that addresses the aforementioned problems.

The invention is defined by the claims.

In accordance with an aspect, there is provided a multi-view display device which is switchable between a single view and a multiple view mode, the display device comprising a display panel having rows and columns of sub-pixels configured to produce a display output, and a lenticular lens arrangement arranged over the display panel on the display output side of the display panel, the lenticular lens arrangement comprising an array of lenticular lens elements which comprise an electro-optic material having a lenticular shape adjacent a non-switchable optically transparent layer having an inverse lenticular shape, wherein the electro-optic material comprises a cholesteric liquid crystal component having an effective refractive index which is controllable by application of an electrical stimulus, the cholesteric liquid crystal component having an ordinary refractive index and an extra-ordinary refractive index which differs from the ordinary refractive index, and comprising a helical structure defined by a pitch, wherein the pitch is selected such that a product of the pitch and said difference is equal to or less than a visible light wavelength of the display output.

The present invention is based on the realization that the polarization-related disadvantages of conventional switchable display devices can be addressed by using an electro-optic material comprising a cholesteric liquid crystal component having a helical pitch which is selected such that a product of the pitch and the difference between the values for the ordinary and extra-ordinary refractive indices is equal to or less than a visible light wavelength of the display output. Such a cholesteric liquid crystal component exhibits an effective refractive index for such a visible wavelength which is independent of the polarization direction. Accordingly, such a material has an isotropic effective refractive index which reflects the fact that the pitch is sufficiently short that the chiral structure of the cholesteric liquid crystal component is not recognized by incident light having such a visible wavelength.

The effective refractive index is controllable by application of an electrical stimulus, e.g. an applied electric field. In this way the lenticular lens element may be switched from a first state in which the effective refractive index of the electro-optic material is controlled to be substantially equal to a further refractive index of the non-switchable optically transparent layer, to a second state in which the effective refractive index differs from the refractive index of the non-switchable optically transparent layer, and vice versa. In the second state, the lenticular lens element performs a light output directing function. In the first state, the light output directing function is removed. The first and second states respectively correspond to the single view and a multiple view modes of the display device.

The pitch may be in the range from 0.1 to 10 μm. A pitch in this range may assist the cholesteric liquid crystal component to satisfy the condition that a product of the pitch and the difference between the extra-ordinary and ordinary refractive indices is equal to or less than a visible light wavelength of the display output.

The cholesteric liquid crystal component may comprise a cross-linked polymer. The cross-linked polymer may assist to stabilize a helical structure of the cholesteric liquid crystal component. This stabilization may, for instance, be realized by tuning the cross-linked polymer content in the cholesteric liquid crystal component. The stiffness or mobility of the cross-linked polymer may, for instance, be controlled by the degree of cross-linking of the polymer used.

The cholesteric liquid crystal component may comprise a helical structure defined by a helical axis. The helical axis may extend along an axis of a plane lying co-planar with respect to the display panel. Alternatively, the helical axis may extend normal to the display panel such that the cholesteric liquid crystal component reflects a portion of the display output with the same handedness as the helical structure back towards the display panel, wherein the pitch of the helical structure is selected such that the portion has a wavelength in the UV region of the spectrum.

It is a known phenomenon of cholesteric liquid crystals that they separate light traveling along the helical axis into right- and left-handed circularly polarized components. The component with the same handedness as the helical structure is reflected, while the other is transmitted. In the case that the helical axis extends normal to the display panel, the pitch of the helical structure may be selected such that the reflected portion of light has a wavelength in the UV region of the spectrum. This may ensure that no visible light is reflected by the electro-optic material, thereby improving the optical efficiency of the display device for visible wavelengths.

The non-switchable optically transparent layer may comprise a further liquid crystal material. The further liquid crystal material may comprise a further cholesteric liquid crystal component comprising a further helical structure defined by a further pitch, and having a further ordinary refractive index and a further extra-ordinary refractive index which differs from the further ordinary refractive index by a further difference; wherein the further pitch is selected such that a further product of the further pitch and the further difference is equal to or shorter than the visible light wavelength of the display output.

By the non-switchable optically transparent layer comprising a further cholesteric liquid crystal component, close matching of the respective refractive indices of the electro-optic material and the non-switchable optically transparent layer may be achieved. This may enhance the quality of the image displayed in the single view mode, particularly at oblique viewing angles.

The further helical axis may extend along an axis of a further plane lying co-planar with respect to the display panel. Alternatively, the further helical axis may extend normal to the display panel such that the further cholesteric liquid crystal component reflects a further portion of light with the same handedness as the further helical structure back towards the display panel, wherein the further pitch of the further helical structure is selected such that the further portion has a further wavelength in the UV region of the spectrum.

As explained in relation to the cholesteric liquid crystal component, selecting the further pitch so as to minimize reflection of visible wavelengths back towards the display panel may improve the optical efficiency of the display device for visible wavelengths.

The display panel may comprise a liquid crystal display panel or an OLED display panel. Owing to the polarization-independent refractive index tuning provided by the electro-optic material, a display panel, such as an OLED display, which delivers non-polarized light may be used, without any requirement for additional polarizing means.

The display device may comprise an autostereoscopic display device, the single view mode comprising a two-dimensional mode, and the multi-view mode comprising a three-dimensional mode.

The display device may comprise a dual view display device, wherein the single view mode comprises a two-dimensional mode in the full field of view of the display, and the multi-view mode comprises two at least partly separated two-dimensional modes at different parts of the full field of view of the display.

In accordance with another aspect, there is provided a method of controlling a display output comprising: providing a display panel having rows and columns of sub-pixels configured to produce a display output; arranging a lenticular lens arrangement over the display panel on the display output side of the display panel, the lenticular lens arrangement including an array of lenticular lens elements which comprise an electro-optic material having a lenticular shape adjacent a non-switchable optically transparent layer having an inverse lenticular shape, the electro-optic material comprising a cholesteric liquid crystal component comprising a helical structure defined by a pitch, and having an ordinary refractive index and an extra-ordinary refractive index which differs from the ordinary refractive index, wherein the pitch is selected such that a product of the pitch and said difference is equal to or less than a visible light wavelength of the display output; and applying an electrical stimulus to the cholesteric liquid crystal component material thereby to control an effective refractive index of the electro-optic material.

In the absence of said electrical stimulus the lenticular lens arrangement may be in a first mode in which the effective refractive index of the electro-optic material is substantially equal to a further refractive index of the non-switchable optically transparent layer. Applying the electrical stimulus may comprise switching the lenticular lens arrangement from the first mode to a second mode in which the effective refractive index is different from the further refractive index.

Alternatively, in the absence of the electrical stimulus the lenticular lens arrangement may be in a second mode in which the effective refractive index of the electro-optic material is different from a further refractive index of the non-switchable optically transparent layer. Applying the electrical stimulus may comprise switching the lenticular lens arrangement from the second mode to the first mode in which the effective refractive index is substantially equal to the further refractive index.

The first mode and the second mode may respectively correspond to the single view mode and the multiple view mode of the display device as defined above.

DETAILED DESCRIPTION OF THE EMBODIMENTS

Figure 1:
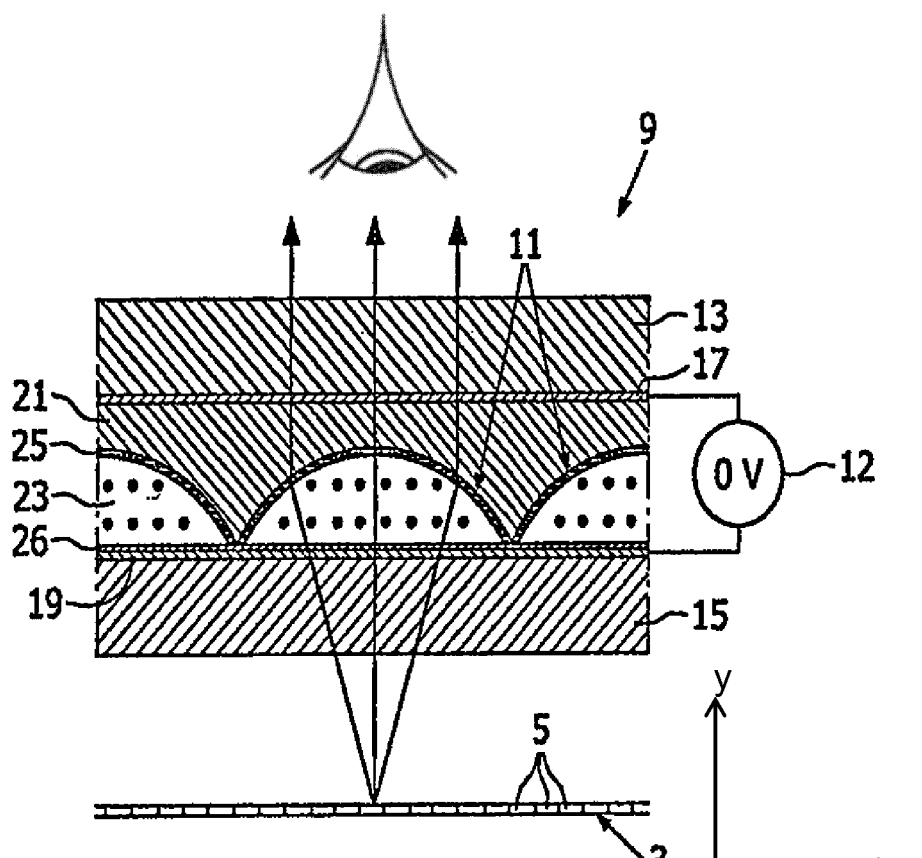
FIGS. 1 and 2 are used to explain the operating principle of the known display device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

A multi-view display device is switchable between a single view and a multiple view mode. The display device comprises a display panel having rows and columns of sub-pixels configured to produce a display output. A lenticular lens arrangement is arranged over a display output side of the display panel and includes an array of lenticular lens elements which comprise an electro-optic material adjacent a non-switchable optically transparent layer. The electro-optic material comprises a cholesteric liquid crystal component having an ordinary refractive index and an extra-ordinary refractive index. The cholesteric liquid crystal component comprises a helical structure defined by a pitch which is selected such that a product of the pitch and the difference between the ordinary and extra-ordinary refractive indices is equal to or less than a visible light wavelength of the display output. An effective refractive index of the cholesteric liquid crystal component is controllable by application of an electrical stimulus thereby permitting switching between the single view and multiple view modes.

Switchable display devices having a viewable display area which may be switched between a two-dimensional display mode and a three-dimensional display mode are known. Switching between modes is achieved by applying an electric field across electro-optic material of an array of lens elements comprising the electro-optic material. In the two-dimensional mode, the lens elements behave as if they were an ordinary sheet of transparent material. In the three-dimensional mode, the lens elements provide a light output directing function so as to enable a stereoscopic image to be perceived. The same switching concept can be applied to a two-dimensional multi-view display, to switch between a single view for the full field of two-dimensional view, and multiple views directed to different spatial locations such that multiple viewers can observe different two-dimensional content in different parts of the total field of view of the display.

Conventional switchable display devices rely on polarized light being used. With non-polarized light, two-dimensional and three-dimensional modes cannot be separated in such conventional devices. Therefore certain display types which, for instance, do not emit polarized light, such as OLED displays, can only be used in combination with a conventional switchable lenticular if an additional polarizer is used. Furthermore, owing to the requirement to employ polarized light, the image quality of conventional switchable display devices when viewed from oblique angles is inferior to when they are viewed at normal incidence. In particular, different refractive indices are perceived at oblique angles compared to when the display device is viewed at normal incidence, resulting in different strength or focusing power of the lenticular lens when viewed at oblique angles. This effect may be detrimental to the performance of the display in both two-dimensional and three-dimensional mode.

The present invention is based on the realization that these polarization-related disadvantages of conventional switchable display devices can be addressed by using an electro-optic material comprising a cholesteric liquid crystal component having a helical pitch which is selected such that a product of the pitch and the difference between the values for the ordinary and extra-ordinary refractive indices is equal to or less than a visible light wavelength of the display output. This is expressed in Equation 1:

$$\lambda \geq \Delta n \cdot p \qquad \text{(Equation 1)}$$

wherein λ is a visible light wavelength of the display output; p is the pitch of the helical structure of the cholesteric liquid crystal component and is defined as the distance required for the director to twist by 2π radians; $\Delta n=n_e-n_o$, $n_e$ and $n_o$ being respectively the extra-ordinary and ordinary refractive indices of the cholesteric liquid crystal component.

It is described by Saito et al. in Optical Materials Express, Vol. 5, No. 7, 1588 that a short-pitch cholesteric liquid crystal component exhibits an effective refractive index, $n_{\mathit{eff}}$, which is independent of the polarization direction for wavelengths of light satisfying Equation 1. Accordingly, such a material has an isotropic $n_{\mathit{eff}}$ which reflects the fact that the pitch is sufficiently short that the chiral structure of the cholesteric liquid crystal component is not recognized by incident light with a sufficiently long wavelength. The effective refractive index, $n_{\mathit{eff}}$, is defined in Equation 2:

$$n_{\mathit{eff}}=K((n_e^2+n_o^2)/2)^{0.5} \quad \text{(Equation 2)}$$

Accordingly, the effective refractive index of the cholesteric liquid crystal component, when Equation 1 is satisfied, corresponds to the root mean square of the extra-ordinary ($n_e$) and ordinary ($n_o$) refractive indices. K corresponds to a gain factor and may be in the range of [0.9-1.1] and preferably in the range of [0.95-1.05].

The minimum pitch of the cholesteric liquid crystal component may depend on the spectral characteristics of the display panel used. For instance, for more red-shifted displays the pitch may be longer than may be selected for blue-shifted displays.

In order to allow for completely polarization insensitive operation, Δn·p may be lower than the shortest wavelength emitted by the display. For example, assuming Δn to be 0.08 the resulting pitch would need to be 5.25 μm in order to meet the requirement of Equation 1 at 0.420 μm.

Furthermore, the effective refractive index of the cholesteric liquid crystal component may be adjusted by using an electric stimulus, such as an electric field. It is noted that when the electrical stimulus is applied, Equation 2 may no longer be precisely applicable owing to partial reorientation, e.g. of some groups, of the cholesteric liquid crystal component as will be described in more detail below. Controlling the isotropic effective refractive index of the cholesteric liquid crystal using an applied electric field may thus permit the lenticular lens elements in the selected portion of the display area to switch between maintaining and removing a light output directing function, which will now be explained with reference to FIG. 3.

Figure 3:
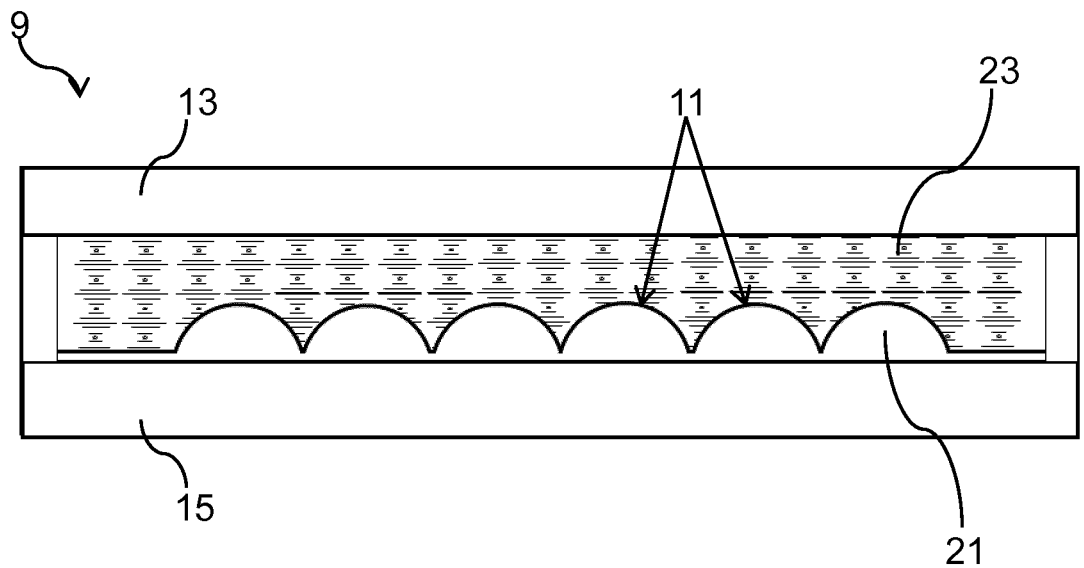
FIG. 3 is a schematic cross-sectional view of a lenticular lens arrangement according to an embodiment.

FIG. 3 schematically depicts a lenticular lens arrangement 9 according to an embodiment. FIG. 3 depicts an array of lenticular lens elements 11 which comprise an electro-optic material 23 adjacent a non-switchable optically transparent layer 21. Whilst in the example shown in FIG. 3, the electro-optic material 23 constitutes the replica part of the lenticular lens element 11, as depicted by the fill pattern in FIG. 3, with the non-switchable optically transparent layer 21 constituting the array of semi-cylindrical portions, a reverse scenario is also conceivable in which the non-switchable optically transparent layer 21 instead defines the replica part of the lenticular lens element 11.

Depending on the respective refractive indices of the electro-optic material 23 and the non-switchable optically transparent layer 21 when a light output directing function is being maintained, either a positive or a negative lens may result.

The non-switchable optically transparent layer 21 and the electro-optic material 23 are sandwiched between two substrates 13, 15. The electro-optic material 23 is between a pair of electrodes (not shown in FIGS. 3 and 4). An electric field may be applied between the electrodes in order to control the effective refractive index of the electro-optic material 23. In this way the lenticular lens element 11 may be switched from a first state in which the effective refractive index of the electro-optic material 23 substantially matches the refractive index of the non-switchable optically transparent layer 21, to a second state in which the effective refractive index differs from the refractive index of the non-switchable optically transparent layer 21, and vice versa. In the second state, the lenticular lens element 11 performs a light output directing function. In the first state, the light output directing function is removed.

Varying the applied electric field may, for instance, result in change to the alignment of the cholesteric liquid crystal component or domains of the cholesteric liquid crystal component. This results in varying of the isotropic effective refractive index of the cholesteric liquid crystal component. Thus by varying the applied electric field, the lenticular lens elements 11 may switch between maintaining and removing a light output directing function.

The pitch of cholesteric liquid crystal materials may be thermally adjustable in certain applications, e.g. in a temperature indicator on a wine bottle. However, adjustment of the pitch by external stimuli may, for instance, be minimized in the present cholesteric liquid crystal component since such adjustment may result in domains being introduced in the liquid crystal component very quickly. To this end, the helical structure may be stabilized in the cholesteric liquid crystal component. Such stabilization may further allow for faster switching.

In an embodiment, the cholesteric liquid crystal component may comprise a cross-linked polymer, i.e. such that the cholesteric liquid crystal component comprises an anisotropic gel structure, allowing for a memory function. The stiffness or mobility of the gel can be controlled by the degree of cross-linking of the polymer used. The stabilization of the helical structure may be realized by, for instance, tuning the gel content in the cholesteric liquid crystal component. Dangling groups of the cholesteric liquid crystal component may be reoriented by the electrical field resulting in adjustment of the effective refractive index. This may also mean that for the electrically addressed mode, i.e. when the electric field is being applied, a small angular sensitivity may start to occur (the 'off-mode' may be angle-insensitive), however polarization insensitivity of the effective refractive index may be retained.

Alignment of the cholesteric liquid crystal component may be required in order to allow for the electric field-induced refractive index adjustment described above. Without alignment, the dangling groups of the cholesteric liquid crystal component may be less reliably and reversibly reoriented, resulting in a less well-defined refractive index and scattering. It may not be critical whether the helical axis is lying parallel or perpendicular with respect to the display panel, as long as it is aligned in a uniform manner.

In one set of examples, the helical axis may extend along an axis of a plane lying co-planar with respect to the display panel (not shown in FIG. 3). In an alternative set of examples, the helical axis may extend normal to the display panel. The latter is schematically depicted by the fill pattern in FIGS. 3 and 4.

It is a known phenomenon of cholesteric liquid crystals that they separate light traveling along the helical axis into right- and left-handed circularly polarized components. The component with the same handedness as the helical structure is reflected, while the other is transmitted. It is also known that the wavelength of the reflected light $\lambda_{ref}$ is given by Equation 3:

$$\lambda_{ref} = n_{eff} \cdot p \qquad \text{(Equation 3)}$$

In the case that the helical axis extends normal to the display panel, the pitch of the helical structure may be selected such that the reflected portion of light has a wavelength in the UV region of the spectrum. This may ensure that no visible light is reflected by the electro-optic material 23, thereby improving the optical efficiency of the display device for visible wavelengths.

Upon switching of the cholesteric liquid crystal component, the reflected wavelength may shift either up or down, based on positive or negative dielectric anisotropy, because of the increased or decreased effective refractive index, whereas the pitch may stay constant. The pitch may, for example, be fixed by the gel content in the cholesteric liquid crystal component, as previously described. Assuming the lowest wavelength to be emitted by the display to be 0.420 μm, and the largest effective refractive index observed to be 1.65, the pitch may be shorter than 0.254 μm in order to avoid reflection of visible light generated by the display panel.

As previously described, assuming Δn to be 0.08, the resulting pitch may be 5.25 μm to meet the polarization independence requirement (Equation 1) at 0.420 μm. It will therefore be evident that a shorter pitch (e.g. <0.254 μm) is required in relation to the reflection band criterion (Equation 3) than that required for polarization insensitive operation (Equation 1).

The non-switchable optically transparent layer 21 may comprise any suitable optically transparent material which has a refractive index which matches an effective refractive index accessible by adjusting the electro-optic material 23. The non-switchable optically transparent layer 21 may, for instance, comprise a material having an isotropic refractive index. For example, the non-switchable optically transparent layer 21 may be an isotropic polymer which may be fabricated using a suitable molding or (photo-)replication technique.

Figure 4:
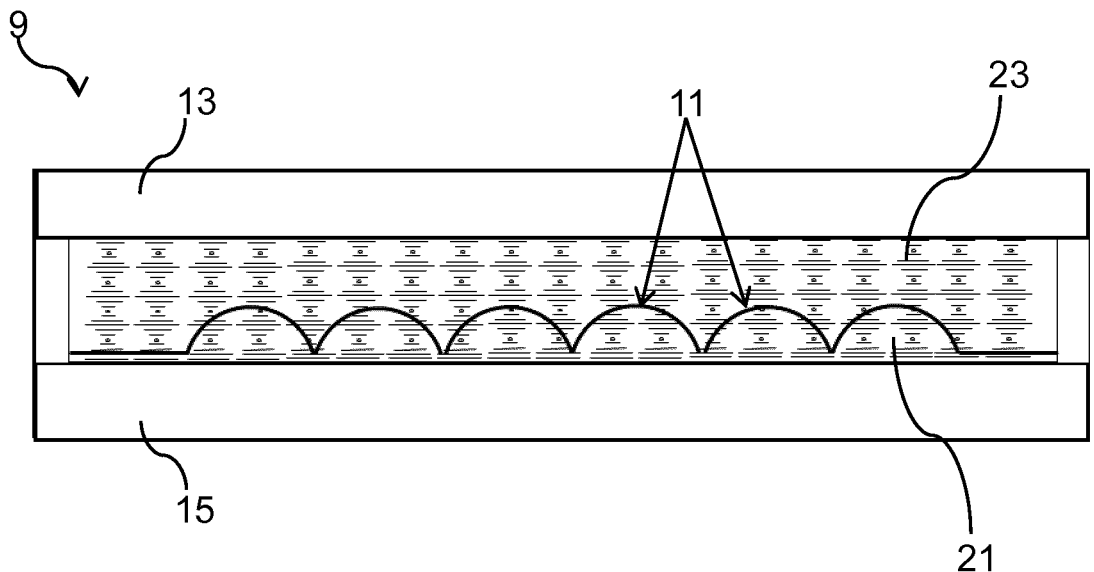
FIG. 4 is a schematic cross-sectional view of a lenticular lens arrangement according to a further embodiment.

In the embodiment schematically depicted in FIG. 4, the non-switchable optically transparent layer 21 comprises a further cholesteric liquid crystal component comprising a further helical structure defined by a further pitch. This further cholesteric liquid crystal component may, for example, be replicated from a suitable pre-fabricated cholesteric mold. For ease of drawing the cholesteric orientation is shown as continuing from the non-switchable optically transparent layer 21 to the electro-optic material 23 but, of course, this will not necessarily be the case in practice. A further difference separates a further extra-ordinary refractive index and a further ordinary refractive index of the further cholesteric liquid crystal component. The further pitch may be selected such that a further product of the further pitch and the further difference is equal to or shorter than the visible light wavelength of the display output.

Similar considerations regarding the effective refractive index of the cholesteric liquid crystal component also apply to the further cholesteric liquid crystal component. Accordingly, the further cholesteric liquid crystal may have a further isotropic effective refractive index which may match an effective refractive index accessible by adjusting the electro-optic material 23. The cholesteric liquid crystal component and the further cholesteric liquid crystal component may be selected to ensure close matching of their respective effective refractive indices in the single view mode of operation of the display device. This may enhance the quality of the image displayed in the single view mode, particularly at oblique viewing angles.

Owing to the isotropic nature of the refractive index (for visible light wavelengths and shorter) of the further cholesteric liquid crystal component, it may be unnecessary to align the liquid crystals of the non-switchable optically transparent layer 21 when fabricating the lenticular lens element 11. Alternatively, the liquid crystals of the further cholesteric liquid crystal component may be aligned such that either the further helical axis extends along an axis of a further plane lying co-planar with respect to the display panel (not shown in FIG. 4), or extends normal to the display panel. In respect of the latter, the further pitch of the further helical structure may be selected such that the light reflected by the further cholesteric liquid crystal component has a further wavelength in the UV region of the spectrum, thereby improving the optical efficiency of the display device for visible wavelengths.

The cholesteric liquid crystal component may, for instance, comprise a right-angle helicoid structure or an oblique helicoidal (heliconical) structure. Using an oblique helicoidal structure may facilitate selection or adjustment of the pitch by adjustment of an electric field applied parallel to the helicoidal axis.

Suitable short-pitch cholesteric liquid crystal components are well-known per se. For instance, Lavrentovich et al. in Advanced Materials, Vol. 27, Issue 19, 2015, 3014-3018 describe a short pitch oblique helicoidal material formed by mixing two dimeric liquid crystals (1',7'-bis(4-cyanobiphenyl-4'-yl)heptane (CB7CB) and 1-(4-cyanobiphenyl-4'-yl)-6-(4-cyanobiphenyl-4'-yloxy)hexane (CB6OCB)), and a standard liquid crystal pentylcyanobiphenyl (5CB) (Merck). The mixtures were doped with a left handed chiral additive 5811 (Merck) that determines the pitch. Three mixtures were used, with composition CB7CB:CB6OCB:5CB:S811 (in weight units) being 30:20:46:4 (cholesteric phase in the range (20-66.5° C.); 30.1:20:45.9:4 (cholesteric phase in the range 22-68° C.); and 29:20:49:2 (cholesteric phase in the range 21-69.5° C.). Such short-pitch cholesterics may be employed for the cholesteric liquid crystal component and/or the further cholesteric liquid crystal component.

In order to stabilize the cholesteric structure, given that the pitch is sensitive to the temperature, and to enable stable switching of the liquid crystal molecules, the cholesteric liquid crystal component may comprise a cross-linked polymer structure, i.e. an anisotropic gel, as previously described. Examples of such materials are described by Kim et al. in Applied Physics Letters, Vol. 86, 161118 (2005). The cholesteric material studied in this work was a mixture of the commercial nematic liquid crystal MLC 6080 (Merck), chiral dopants CE1, CB15, R-1011 (Merck), reactive nematic monomer RM257 (1,4-bis[3-(acryloyloxy)propyloxy]-2-methyl benzene; Merck), and photoinitiator Irgacure 651 (2,2-dimethoxy-2-phenyl acetophenone; Ciba Additives). These materials were homogeneously mixed by melting in the weight ratio: 70 (MLC 6080)/5.0 (RM257)/25 (CE1:CB15:R-1011=3:3:1)/0.25 (Irgacure 651). The pitch of the cholesteric mixture was found to be about 0.6 μm.

The pitch may, for instance, be measured by scanning electron microscopy (SEM). Using this technique, the periodicity of the anisotropic gel structure may be determined which may correspond to the pitch of the cholesteric material.

In an embodiment, the pitch may be in the range from 0.1 to 10 μm. In order to satisfy Equation 1, a pitch of, for instance, 10 μm would necessitate the cholesteric liquid crystal component having a difference between the extraordinary and ordinary refractive indices of at most 0.07, i.e. corresponding to a 0.7 µm (700 nm) wavelength which is at a higher end of the range of wavelengths of visible light. The cholesteric liquid crystal component, and its pitch, may be selected according to the wavelengths produced by the display panel 3, as will be immediately apparent to the skilled person.

Figure 5:
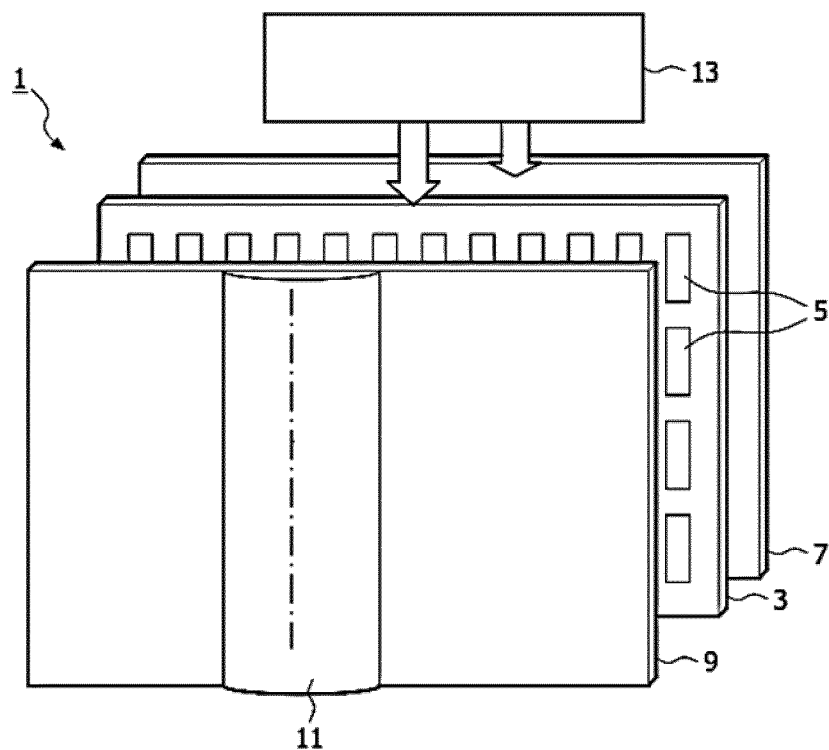
FIG. 5 is a schematic perspective view of a known autostereoscopic display device to which the invention can be applied.

FIG. 5 is a schematic perspective view of a known switchable autostereoscopic display device 1, and to which the present invention can be applied. The display device 1 is shown in expanded form.

The known device 1 comprises a liquid crystal display panel 3 of the active matrix type that acts as a spatial light modulator to produce the display. The display panel 3 has an orthogonal array of sub-pixels 5 arranged in rows and columns. For the sake of clarity, only a small number of sub-pixels 5 are shown in FIG. 5. In practice, the display panel 3 might comprise about one thousand rows and several thousand columns of sub-pixels 5.

The display panel 3 may comprise a liquid crystal display panel or an OLED display panel. Owing to the polarization-independent refractive index tuning provided by the electro-optic material 23, a display panel, such as an OLED display, which delivers non-polarized light may be used, without any requirement for additional polarizing means. Accordingly, the display panel 3 may also include the combiner of a head-up display.

In examples where the display panel 3 comprises a liquid crystal display panel, the structure of the liquid crystal display panel may be entirely conventional. Accordingly, such a liquid crystal display panel may comprise a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates. Each display sub-pixel 5 may comprise opposing electrodes on the substrates, with the intervening liquid crystal material between. The shape and layout of the sub-pixels 5 are determined by the shape and layout of the electrodes. The sub-pixels 5 are regularly spaced from one another by gaps. Each sub-pixel 5 is associated with a switching element, such as a thin film transistor (TFT) or thin film diode (TFD). The sub-pixels 5 are operated to produce a display by providing addressing signals to the switching elements, and suitable addressing schemes will be known to those skilled in the art.

The gaps between the sub-pixels 5 are covered by an opaque black mask. The mask is provided in the form of a grid of light absorbing material. The mask covers the switching elements and defines the individual sub-pixel areas.

The display panel 3 is illuminated by a light source 7 comprising, in this case, a planar backlight extending over the area of the sub-pixel array. Light from the light source 7 is directed through the display panel 3, with the individual sub-pixels 5 being driven to modulate the light and produce the display.

The display device 1 also comprises a lenticular lens arrangement 9 positioned over the display output side of the display panel 3, which arrangement is controllable to selectively perform a view forming function. The lenticular lens arrangement 9 comprises an array of lenticular lens elements 11 extending parallel to one another, of which only one is shown with exaggerated dimensions for the sake of clarity.

Figure 6:
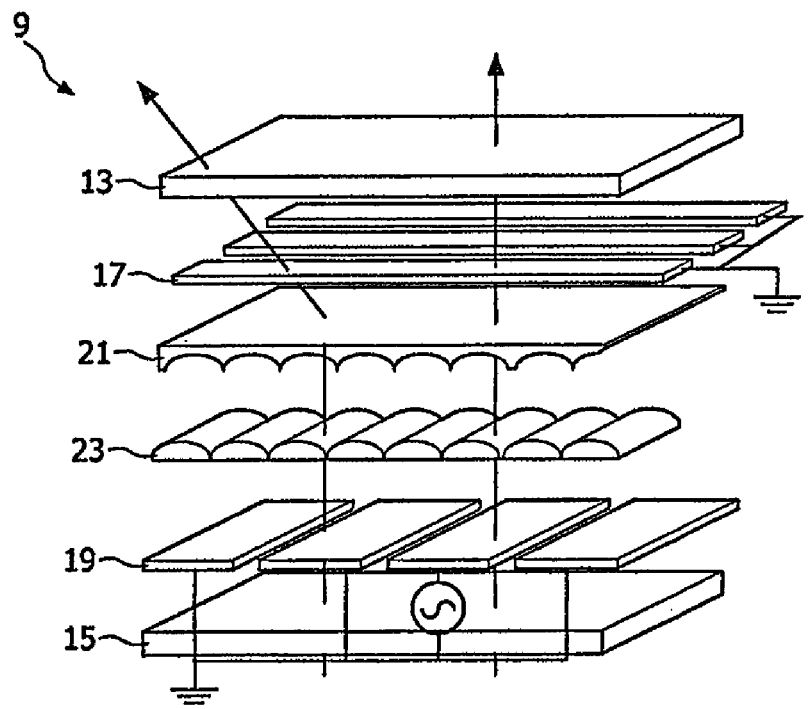
FIG. 6 is a detailed schematic view of a lenticular lens arrangement of the known display device shown in FIG. 5.

The lenticular lens arrangement 9 is shown schematically in more detail in FIG. 6. The arrangement 9 is shown in expanded form.

Referring to FIG. 6, it can be seen that the lenticular element arrangement 9 comprises a pair of transparent glass substrates 13, 15, with transparent electrode layers 17, 19 formed of indium tin oxide (ITO) provided on their facing surfaces. Each electrode layer 17, 19 is in the form of a plurality of parallel elongate electrodes, and electrodes of the respective different layers 17, 19 are arranged perpendicular to one another. The elongate electrodes are arranged with small gaps there between to enable them to be separately addressed. Instead of being subdivided as shown, the electrode layers 17, 19 may, in alternative examples, each comprise a continuous electrode structure. Thus the electrodes 17 and 19 may each be single electrodes extending continuously over the sub-pixel array and operable by the application thereto of suitable voltages simply to switch the display output in its entirety between two-dimensional and three-dimensional display modes.

Figure 2:
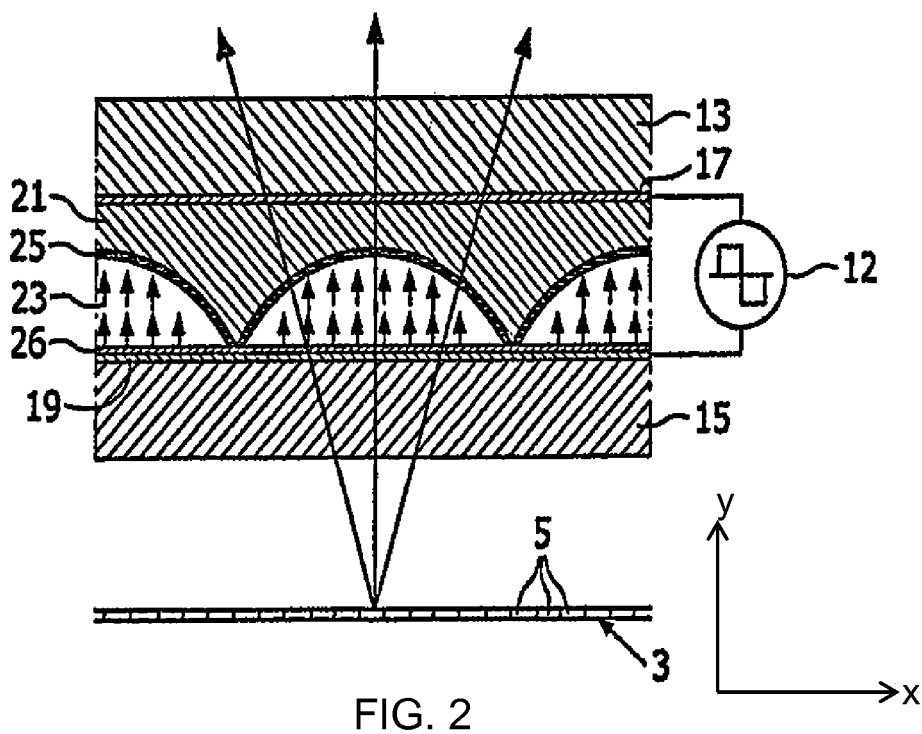

A non-switchable optically transparent layer 21 constituting a lenticular body and in the form of a sheet, or plate, having an inverse lenticular structure, is provided between the substrates 13, 15, adjacent to an upper one of the substrates 13. In this example, electro-optic material 23 is also provided between the substrates 13, 15, adjacent to the lower one of the substrates 15. The inverse lenticular structure of the lenticular body 21 causes the electro-optic material 23 to assume parallel, elongate semi-cylindrical lenticular shapes, between the lenticular body 21 and the lower substrate 15, as shown in the figure. Surfaces of the inverse lenticular structure of the body 21 and the lower substrate 15 that are in contact with the electro-optic material 23 may also be provided with an orientation layer, 25 and 26 (see FIGS. 1 and 2), for orientating the liquid crystal material, if alignment is desired.

In use, the known switchable display device 1 shown in FIGS. 5 and 6 is operable to provide a display output, discrete portions of which can be switched either alone, or in combination, between two-dimensional and three-dimensional display modes. In this way, one or more two-dimensional display windows can be provided in a three-dimensional display area.

Switchability of discrete portions of the display output between the modes is achieved by applying an electric field across the lenticular lens elements 11 comprising the electro-optic material 23. This electric field is generated by applying an electrical potential across electrodes of the electrode layers 17, 19.

The electrical potential is applied to a selected number of adjacent ones of the elongate electrodes in each electrode layer 17, 19. The selection of the upper electrodes defines a height of a display window that is to be switched, and the selection of the lower electrodes defines a width of the display window to be switched.

As explained above, the invention can be applied to displays having a single view two-dimensional mode and either a multi-view three-dimensional display in which each viewer may experience a three-dimensional effect or a multi-view display presenting multiple two-dimensional views to different locations in front of a display such that different viewers may see different content.

Figure 7:
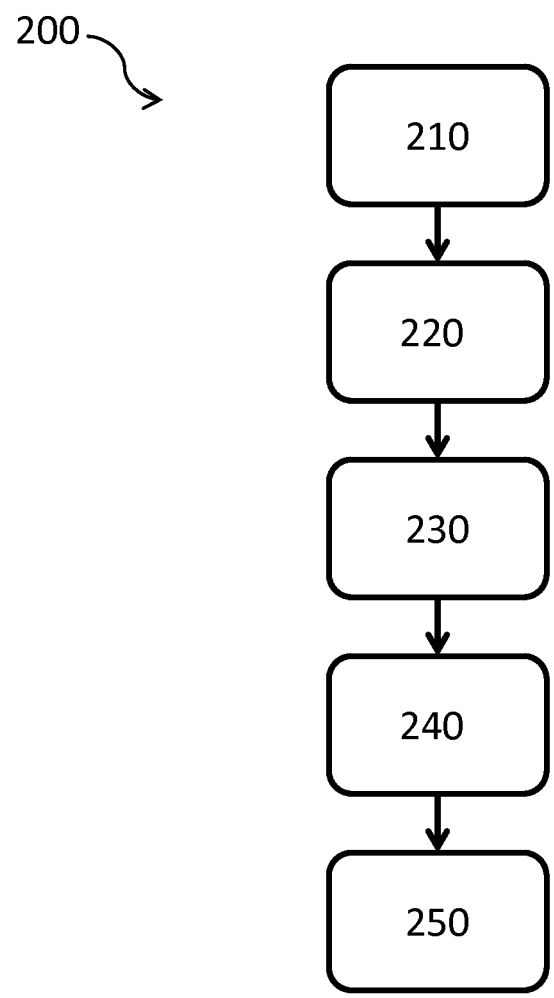
FIG. 7 shows a flowchart of controlling a display output according to an embodiment.

FIG. 7 shows a flowchart of a method 200 of controlling a display output according to an embodiment. The method 200 commences in step 210. Subsequently a display panel is provided in step 220, the display panel having rows and columns of sub-pixels configured to produce a display output. In step 230, a lenticular lens arrangement is arranged over the display panel on the display output side of the display panel, the lenticular lens arrangement including an array of lenticular lens elements which comprise an electro-optic material adjacent to a non-switchable optically transparent layer. The electro-optic material comprises a cholesteric liquid crystal component comprising a helical structure defined by a pitch, and having an ordinary refractive index and an extra-ordinary refractive index which differs from the ordinary refractive index. The pitch is selected such that a product of the pitch and the difference is equal to or less than a visible light wavelength of the display output. In step 240, an electrical stimulus is applied to the cholesteric liquid crystal component material thereby to control an effective refractive index of the electro-optic material. The method terminates in step 250.

In the absence of said electrical stimulus the lenticular lens arrangement may be in a first mode in which the effective refractive index of the electro-optic material is substantially equal to a further refractive index of the non-switchable optically transparent layer. Applying 240 the electrical stimulus may comprise switching the lenticular lens arrangement from the first mode to a second mode in which the effective refractive index is different from the further refractive index.

Alternatively, in the absence of the electrical stimulus the lenticular lens arrangement may be in the second mode in which the effective refractive index of the electro-optic material is different from a further refractive index of the non-switchable optically transparent layer. Applying 240 the electrical stimulus may comprise switching the lenticular lens arrangement from the second mode to the first mode in which the effective refractive index is substantially equal to the further refractive index.

The first mode and the second mode may respectively correspond to the single view mode and the multiple view mode of the display device as described above.

It should be noted that in addition to considerations relating to how the lenticular lens arrangement is configured in terms of which mode, i.e. the first mode or the second mode, is accessed by application of the electrical stimulus, the skilled person will recognise that other considerations may be factored into the design and configuration of the lenticular lens arrangement. A multi-view mode may, for instance, be realized by a strong positive lenticular lens and a single view mode by a neutral lens. Such a lenticular lens arrangement can be realised in multiple ways but for each method the type and shape of the switchable and non-switchable lens part need to be considered. Note that also the refractive index change upon switching may be negative or positive (although for most liquid crystal materials this is negative).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Any reference signs in the claims should not be construed as limiting the scope.

The invention claimed is:

1. A display device which is switchable between a single view mode and a multiple view mode, comprising:
 a display panel,
  wherein the display device has rows and columns of sub-pixels and a display output side,
  wherein the display panel is arranged to produce a display output; and
 a lenticular lens arrangement,
  wherein the lenticular lens arrangement is disposed over the display panel on the display output side,
  wherein the lenticular lens arrangement comprises an array of lenticular lens elements,
  wherein the lenticular lens elements comprise an electro-optic material,
  wherein the lenticular lens elements have a lenticular shape,
  wherein the lenticular lens elements are adjacent to a non-switchable optically transparent layer,
  wherein the non-switchable optically transparent layer has an inverse lenticular shape,
  wherein the electro-optic material comprises a first cholesteric liquid crystal component,
  wherein the first cholesteric liquid crystal component has an effective refractive index which is controllable by application of an electrical stimulus,
  wherein the first cholesteric liquid crystal component has a first ordinary refractive index and a first extra-ordinary refractive index,
  wherein the first ordinary refractive index differs from the first extra-ordinary refractive index by a first difference,
  wherein the first cholesteric liquid crystal component comprises a first helical structure,
  wherein the first helical structure is defined by a first pitch,
  wherein the first pitch is selected such that a first product of the first pitch and the first difference is equal to or less than a visible light wavelength of the display output.

2. The display device of claim 1,
 wherein the non-switchable optically transparent layer has a second refractive index,
 wherein the effective refractive index of the electro-optic material is controlled to be substantially equal to the second refractive index in the single view mode of operation of the display device.

3. The display device of claim 1, wherein the first pitch is in the range from 0.1 μm to 10 μm.

4. The display device of claim 1, wherein the first cholesteric liquid crystal component comprises a cross-linked polymer.

5. The display device of claim 1,
 wherein the first helical structure is defined by a first helical axis,
 wherein the first helical axis extends along an axis of a first plane lying co-planar with respect to the display panel.

6. The display device of claim 1,
 wherein the first helical structure is defined by a first helical axis,
 wherein the first helical axis extends normal to the display panel such that the first cholesteric liquid crystal component reflects a first portion of the display output with the same handedness as the helical structure back towards the display panel,
 wherein the first pitch of the helical structure is selected such that the first portion has a first wavelength in the UV region of the spectrum.

7. The display device of claim 1, wherein the non-switchable optically transparent layer comprises a second liquid crystal material.

8. The display device of claim 7,
wherein the second liquid crystal material comprises a second cholesteric liquid crystal component,
wherein the second cholesteric liquid crystal component comprises a second helical structure,
wherein the second helical structure is defined by a second pitch,
wherein the second cholesteric liquid crystal component has a second ordinary refractive index and a second extra-ordinary refractive index,
wherein the first ordinary refractive index differs from the second ordinary refractive index by a second difference,
wherein the second pitch is selected such that a second product of the second pitch and the second difference is equal to or shorter than the visible light wavelength of the display output.

9. The display device of claim 8, wherein the second helical axis extends along an axis of a second plane lying co-planar with respect to the display panel.

10. The display device of claim 8,
wherein the second cholesteric liquid crystal component comprises a second helical axis,
wherein the second helical axis extends normal to the display panel such that the second cholesteric liquid crystal component reflects a second portion of light with the same handedness as the second helical structure back towards the display panel,
wherein the second pitch of the second helical structure is selected such that the second portion has a second wavelength in the UV region of the spectrum.

11. The display device of claim 1, wherein the display panel comprises a liquid crystal display panel or an OLED display panel.

12. The display device of claim 1,
wherein the display device comprises an autostereoscopic display device,
wherein the single view mode comprises a two-dimensional mode,
wherein the multi-view mode comprises a three-dimensional mode.

13. The display device of claim 1,
wherein the display device comprises a dual view display device,
wherein the single view mode comprises a two-dimensional mode in the full field of view of the display,
wherein the multi-view mode comprises two at least partly separated two-dimensional modes at different parts of the full field of view of the display.

14. A method of controlling a display output comprising:
providing a display panel,
wherein the display device has rows and columns of sub-pixels and a display output side,
wherein the display panel is arranged to produce a display output;
arranging a lenticular lens arrangement over the display panel on the display output side of the display panel,
wherein the lenticular lens arrangement comprises an array of lenticular lens elements,
wherein the lenticular lens elements comprise an electro-optic material,
wherein the lenticular lens elements have a lenticular shape,
wherein the lenticular lens elements are adjacent a non-switchable optically transparent layer,
wherein the non-switchable optically transparent layer has an inverse lenticular shape;
wherein the electro-optic material comprises a first cholesteric liquid crystal component,
wherein the first cholesteric liquid crystal component has a first helical structure,
wherein the first helical structure is defined by a first pitch,
wherein the first cholesteric liquid crystal component has a first ordinary refractive index and a first extra-ordinary refractive index,
wherein the first ordinary refractive index differs from the first ordinary refractive index,
wherein the first pitch is selected such that a first product of the first pitch and the first difference is equal to or less than a visible light wavelength of the display output; and
applying an electrical stimulus to the first cholesteric liquid crystal component material thereby to control an effective refractive index of the electro-optic material.

15. The method of claim 14,
wherein in the absence of the electrical stimulus the lenticular lens arrangement is in a first mode,
wherein in the absence of the electrical stimulus the effective refractive index of the electro-optic material is substantially equal to a second refractive index of the non-switchable optically transparent layer,
wherein applying the electrical stimulus comprises switching the lenticular lens arrangement from the first mode to a second mode,
wherein in the second mode the effective refractive index is different from the second refractive index.

16. The method of claim 14,
wherein in the absence of the electrical stimulus the lenticular lens arrangement is in a second mode,
wherein in the absence of the electrical stimulus the effective refractive index of the electro-optic material is different from a second refractive index of the non-switchable optically transparent layer,
wherein applying the electrical stimulus comprises switching the lenticular lens arrangement from the second mode to a first mode in which the effective refractive index is substantially equal to the second refractive index.

17. The method of claim 14,
wherein the non-switchable optically transparent layer has a second refractive index,
wherein the effective refractive index of the electro-optic material is controlled to be substantially equal to the second refractive index in the single view mode of operation of the display device.

18. The method of claim 14, wherein the first pitch is in the range from 0.1 μm to 10 μm.

19. The method of claim 14, wherein the first cholesteric liquid crystal component comprises a cross-linked polymer.

20. The method of claim 14,
wherein the first helical structure is defined by a first helical axis,
wherein the first helical axis extends along an axis of a first plane lying co-planar with respect to the display panel.

* * * * *